Nov. 15, 1960 M. N. McKINNON 2,960,156
AUXILIARY FUEL SYSTEM FOR VEHICLES
Filed March 23, 1956
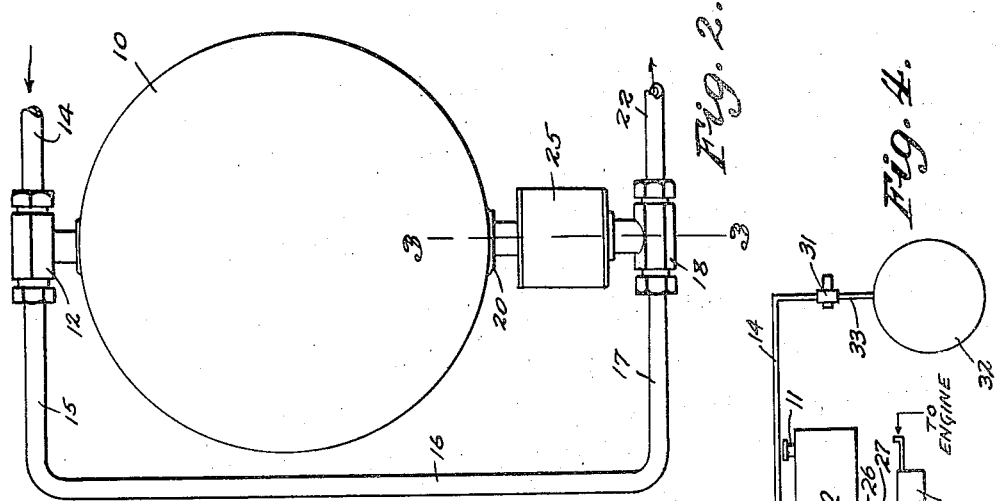
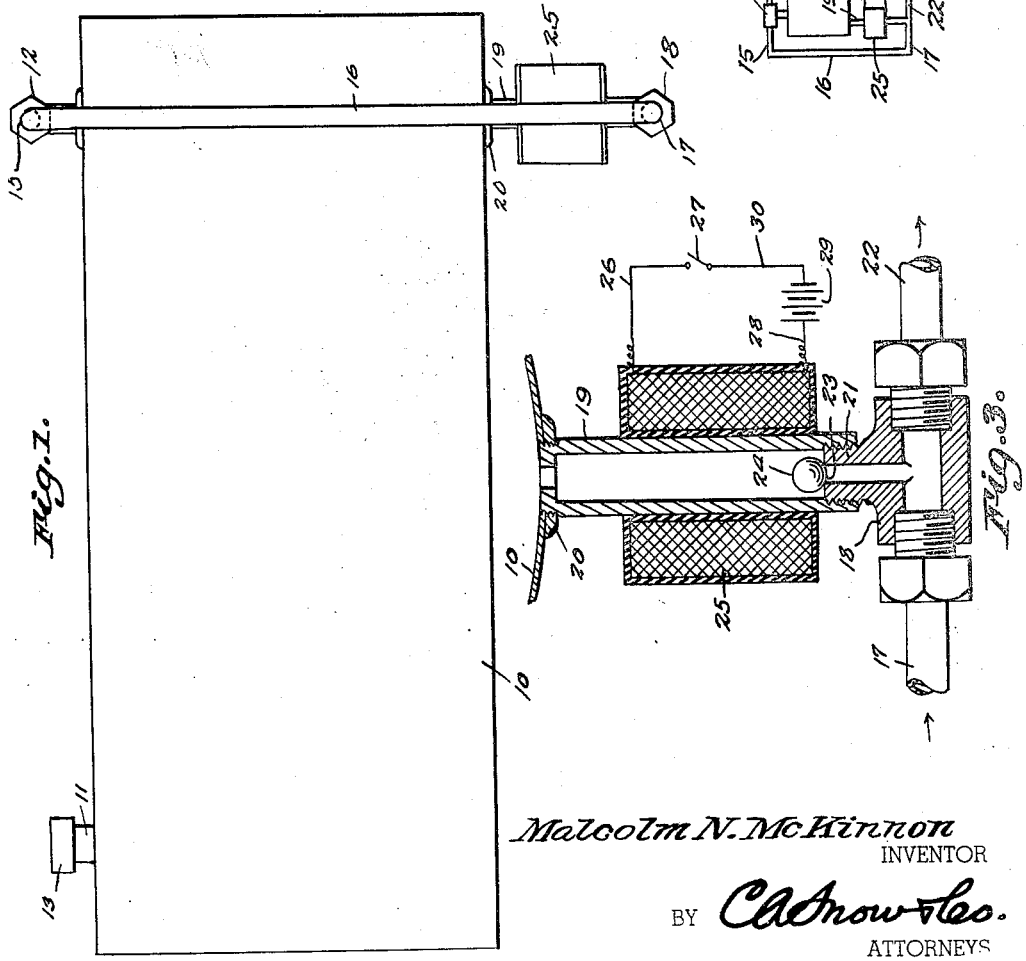
Malcolm N. McKinnon
INVENTOR
BY C.A. Snow & Co.
ATTORNEYS United States Patent Office 2,960,156
Patented Nov. 15, 1960

2,960,156
AUXILIARY FUEL SYSTEM FOR VEHICLES

Malcolm N. McKinnon, American Fuel Company,
1224 S. Main St., Salt Lake City 4, Utah Filed Mar. 23, 1956, Ser. No. 573,439

1 Claim. (Cl. 158—46.5)

This invention relates to an auxiliary fuel system for vehicles.

An object of this invention is to provide in a fuel system for vehicles an auxiliary fuel tank connected in the fuel system between the pump and the carburetor or between the main tank and pump.

Another object of this invention is to provide an auxiliary or emergency fuel tank connected in the fuel system with means whereby the fuel from the emergency tank may be normally held against flowing to the carburetor by gravity, but upon failure of the normal fuel supply by exhausting of the main tank or failure of the fuel pump the fuel in the emergency tank may be communicated with the fuel system so that the vehicle may be operated for a short period of time.

A further object of this invention is to provide an emergency fuel tank and connecting means for connecting the tank in the fuel system of the vehicle, which is of simple construction and may be connected in the fuel systems of various types of vehicles.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a detail side elevation of an emergency fuel tank constructed according to an embodiment of this invention.

Fig. 2 is an end elevation looking from the right end of Fig. 1.

Fig. 3 is a fragmentary sectional view on an enlarged scale taken on line 3—3 of Fig. 2.

Figure 4 is a diagram illustrating the relation of the invention with respect to the main fuel tank, fuel pump and carburetor of a motor vehicle.

Referring to the drawing, the numeral 10 designates generally a fuel tank which is adapted to be mounted at a point adjacent the carburetor of the vehicle and above the carburetor designated by the reference character "C" so that the fuel from the tank 10 will flow by gravity when desired, to the carburetor. The tank 10 is provided with a nipple or neck 11, and an inspection cap 13 is removably mounted on the neck 11. The tank 10 has a T-connection 12 mounted in the top thereof and a pipe 14 is connected at one end to the T 12 and is connected at the other end to the outlet side of the fuel pump 31, which connects with the main gasoline tank 32 of the vehicle, through pipe 33. A pipe 15 is connected at one end to the opposite end of the T 12 in alignment with pipe 14 and the pipe 15 extends downwardly, as indicated at 16, to a point below the tank 10. The pipe 15 includes an inwardly projecting branch 17 which is connected to one branch of a lower T-coupling 18. The fuel from the tank 10 is adapted to be drained out therefrom through a tubular outlet member 19 which is connected at its upper end to a bushing 20 carried by the bottom of the tank 10. The tubular member or sleeve 19 is formed of non-magnetic metal and the lower end of tubular member 19 is threaded onto the stem 21 of the T-member 18. A pipe 22 is connected at one end to a T-coupling 18 in alignment with branch 17 and the opposite end of pipe 22 is connected to the intake side of the carburetor. The stem 21 is provided at its upper inner end with a seat 23 and a ball check 24 is adapted to gravitatingly engage on the seat 23 so as to normally hold the liquid in tank 10 from flowing downwardly through coupling 18 into pipe 22.

In order to provide means whereby the ball check 24 may be lifted from the seat 23 so as to effect draining of the tank 10 to the carburetor, I have provided an electro-magnetic coil 25 which is disposed about the tubular member 19. One end of the coil 25 is connected by means of a conductor 26 to a switch 27 and the other end of the coil 25 is connected by means of a conductor 28 to one side of a battery or electric supply source 29. Switch 27 is connected by means of a conductor 30 to the other side of the battery supply source 29.

In the use and operation of this emergency fuel system, shown in Figs. 1, 2 and 3, the tank 10 is connected between pipe 14 and pipe 22 and is positioned at a point above the level of the carburetor so that the fuel in tank 10 may gravitatingly flow to the carburetor. If desired the tank 10 may be filled through the neck 11 so that when the vehicle engine is initially started the fuel from the fuel pump will flow through pipe 14, pipes 15, 16 and 17, through coupling 18 and then through pipe 22 to the carburetor. It has been found from experiment, however, that tank 10 will automatically fill up in a few minutes, and the air initially in tank 10 will gradually become exhausted through the carburetor. In the event the main fuel tank becomes exhausted fuel from tank 10 may be used by closing switch 27 so as to energize coil 25. At this time the ball check 24 will be raised upwardly to an open position so that the fuel in tank 10 may flow downwardly through stem 21 and coupling 18 into fuel line 22. Tank 10 will, therefore, provide an additional supply of fuel which is normally not used and the amount of fuel in tank 10 will be sufficient to permit the vehicle to be moved to a service station or the like.

With tank 10 disposed above the carburetor and connected between the carburetor and pump, in the event of failure of the pump and stoppage of the engine, the fuel in tank 10 may be permitted to flow to the engine by gravity by energizing coil 25 so as to raise valve 24 to open position.

With tank 10 connected between the main fuel tank and the suction side of the pump, when the gauge of the main tank registers "empty," the fuel from tank 10 may be drawn by the pump by opening valve 24, as hereinbefore set forth.

What is claimed is:

In a vehicle fuel system embodying a main fuel tank, a pump and carburetor, and a fuel supply pipe, an auxiliary fuel tank interposed in said system, said auxiliary tank having an upper constantly open intake pipe communicating with said fuel supply pipe, a normally closed lower outlet pipe in the bottom of said auxiliary tank, a pipe connected with said upper inlet pipe and lower outlet pipe providing the normal fuel supply pipe to said carburetor, bypassing said auxiliary tank directing fuel to said carburetor independently of said auxiliary tank, a normally closed ball check valve operating in said lower outlet pipe, and electromagnetic mechanism associated with said check valve adapted upon energization thereof to move said ball valve to open position, releasing fuel to said normal fuel supply pipe.

References Cited in the file of this patent

UNITED STATES PATENTS

| 1,303,290 | Gibbs | May 13, 1919 |
| 2,118,079 | Goode et al. | May 24, 1938 |

FOREIGN PATENTS

| 880,067 | France | Mar. 12, 1943 |
| 1,035,612 | France | Apr. 22, 1953 |
| 262,590 | Great Britain | Dec. 16, 1926 |